United States Patent
Servida

(10) Patent No.: US 9,458,037 B2
(45) Date of Patent: Oct. 4, 2016

(54) METHOD FOR PURIFYING A FLUID THROUGH A THROUGH-FLOW CONDENSER, AND APPARATUS FOR PURIFYING A FLUID, IN PARTICULAR SUITABLE FOR IMPLEMENTING SUCH A METHOD

(75) Inventor: Tullio Servida, Milan (IT)

(73) Assignee: IDROPAN DELL'ORTO DEPURATORI S.R.L., Milan (IT)

( * ) Notice: Subject to any disclaimer, the term of this patent is extended or adjusted under 35 U.S.C. 154(b) by 491 days.

(21) Appl. No.: 13/593,998

(22) Filed: Aug. 24, 2012

(65) Prior Publication Data

US 2013/0048510 A1    Feb. 28, 2013

Related U.S. Application Data

(63) Continuation-in-part of application No. PCT/IB2011/000405, filed on Feb. 24, 2011.

(51) Int. Cl.
| | | |
|---|---|---|
| *C02F 1/461* | (2006.01) | |
| *C02F 1/469* | (2006.01) | |
| *C02F 5/00* | (2006.01) | |

(52) U.S. Cl.
CPC ............. *C02F 1/4691* (2013.01); *C02F 5/00* (2013.01); *C02F 2303/16* (2013.01)

(58) Field of Classification Search
CPC .................................................. C02F 1/4691
See application file for complete search history.

(56) References Cited

U.S. PATENT DOCUMENTS

| | | | | |
|---|---|---|---|---|
| 3,632,490 | A | * | 1/1972 | Covington ..................... 5/660 |
| 5,779,891 | A | * | 7/1998 | Andelman ................ 210/198.2 |
| 6,309,532 | B1 | * | 10/2001 | Tran ........................ B01J 47/08 |
| | | | | 204/267 |
| 2002/0167782 | A1 | * | 11/2002 | Andelman et al. ........... 361/302 |
| 2008/0025874 | A1 | * | 1/2008 | Coughlin ................... 422/82.01 |
| 2008/0259338 | A1 | * | 10/2008 | Sanchez ................ G01N 21/15 |
| | | | | 356/432 |
| 2009/0114598 | A1 | * | 5/2009 | van Kralingen et al. .... 210/676 |
| 2011/0168567 | A1 | * | 7/2011 | Smith et al. .................. 205/350 |

FOREIGN PATENT DOCUMENTS

| | | |
|---|---|---|
| WO | 2006079417 A1 | 8/2006 |
| WO | 2008094367 A1 | 8/2008 |
| WO | 2009012427 A1 | 1/2009 |

* cited by examiner

*Primary Examiner* — Keith Hendricks
*Assistant Examiner* — Salil Jain
(74) *Attorney, Agent, or Firm* — Browdy and Neimark, P.L.L.C.

(57) ABSTRACT

Apparatus for purifying a fluid through a through-flow condenser, which includes a tank of solubilizing product and a mechanism for inserting it into a momentarily interrupted supply conduit. After having inserted a measured dose of solubilizing product received from a tank into the same supply conduit, a logic control unit controls its forward motion in the condenser through the passage of a fluid transportation flow rate measured to transport the dose of solubilizing product up to the electrodes of the condenser.

9 Claims, 3 Drawing Sheets

METHOD FOR PURIFYING A FLUID THROUGH A THROUGH-FLOW CONDENSER, AND APPARATUS FOR PURIFYING A FLUID, IN PARTICULAR SUITABLE FOR IMPLEMENTING SUCH A METHOD

FIELD OF APPLICATION

The present invention concerns a method for purifying a fluid through a through-flow condenser, and an apparatus for purifying a fluid, in particular for implementing such a method, according to the preamble of the respective independent claims.

Through-flow condensers are known to be used to remove undesired concentrations of contaminants from fluids, and more specifically usually from liquids, said contaminants for example consisting of salts dissolved inside them.

For example, it is known to use them to desalinate sea water, to soften particularly hard water or more generally to remove salts (such as chlorides and sulphates), nitrates, nitrites, ammonia, heavy metals, organic substances or micro-pollutants in general from water, or furthermore to deionise fluids, for example in industrial processes or other.

The present invention therefore applies to the industrial field of the purification of fluids and in particular the field of deionization of fluids and water desalination.

STATE OF THE ART

Through-flow condensers conventionally comprise a plurality of stacked electrodes, between which the fluid to be purified is made to pass. The electrodes are formed with layers of conductive materials facing one another and they are charged with opposite polarity by a direct current power supply to generate an electrostatic field between the adjacent electrodes.

During a foreseen service step, the fluid flows between the electrodes having different polarity and the ions, for example of dissolved salts, and/or the charged particles present in the fluid, are attracted by the electrodes and held on them by the action of the electric field. In a regeneration step after the service step, the electric field is removed and the ions, which have accumulated on the electrodes, are evacuated through the use of a discharge flow.

The alternate layers of electrodes are separated from one another by spacing layers, in which the flow of fluid flows. Such spacing layers are made from a non-conductive and porous material like for example a nylon fabric.

Known through-flow condensers indicated above are for example described in U.S. Pat. No. 6,413,409 and U.S. Pat. No. 5,360,540.

The operation of such condensers foresees the alternation of services steps, in which the concentration of solutes at the electrodes takes place, and regeneration steps, in which the solutes that have accumulated on the electrodes are removed through the discharge flow.

The ability of the electrodes to capture the ions in solution and the charged particles is a characteristic that has a positive impact upon the operation of the condenser. The electrodes in the through-flow condensers electrostatically absorb and release the contaminants of ionic charges and actively participate in the deionisation process of the liquid to be treated. The electrodes are for this purpose formed from porous structures of conductive materials.

For this there are, for example, numerous known materials that can be used to make the electrodes such as, for example, active carbon sponge moulded in the form of sheets or fibres as described for example in U.S. Pat. No. 6,413,409 or else sheets of a mixture comprising PTFE as described for example in U.S. Pat. No. 6,413,409

Furthermore, it is known from U.S. Pat. No. 6,709,560 that it is possible to associate the surfaces of the conductive layers of the electrodes with layers of permeable or semi-permeable material, in particular capable of selectively trapping the ions that migrate towards the corresponding electrode under the action of the field. Such layers for example consist of a semi-permeable membrane selectively of the anion exchange or cation exchange type. The ions are thus held and trapped in the layer of such a material close to the electrode towards which they migrate, no longer being subjected to the swirling action of the fluid. The use of these materials has made it possible to improve the efficiency of the flow condensers allowing a greater amount of ions and, more generally, of charged contaminants to be held and concentrated.

It is worth noting that unlike other electro-deionization systems, the method for removing the solutes used in flow condensers does not substantially involve oxidation-reduction reactions and the passage of current between the electrodes is mainly due to the giving up of charge following the contact of the ions with the electrodes under the action of the field.

A very big problem in the field in question concerns the need to avoid the solutes precipitating inside the flow condenser clogging up the passage channels of the fluid and thus making the condenser itself inserviceable in the long term.

As known, when the salts present in a solution exceed their saturation point they precipitate creating crystals or incrustations.

For example, calcium sulphate and calcium carbonate are often included in the fluid to be treated, as a source of water to be deionized, in concentrations such as to easily reach the saturation point inside the flow condenser, in particular at the electrodes where its concentration is foreseen. Consequently, such salts tend to precipitate and encrust the condenser. The crystals that form during the precipitation can close the pores of the spacing layer and decrease or completely block the passage of the fluid to be treated.

Concerning this, U.S. Pat. No. 5,425,858 describes a through-flow condenser in which the spacing layers define coil channels for the evacuation of the liquid in the form of long exit paths for the flow. The long flow paths of the coil channels make it difficult to drain the condenser before the crystallization takes place. Crystals and precipitates can thus easily deposit in the flow paths of the channels of the spacing layers, blocking them. Moreover, the precipitates that have partially encrusted the coiled flow paths determine a reduction of the passage flow of the fluid and offer further encrustation points for other precipitates that will thus then be more difficult to remove.

In order to avoid these drawbacks patent EP 861114, considers the kinetic process that leads to the formation of crystals and encrusting precipitates, and it teaches to use a flow condenser configured so that the fluid passage channels through the condenser are particularly short and preferably straight.

The complete expulsion of the solutes during the regeneration step is particularly important to avoid the same solutes dissolved in the liquid to be treated having the possibility, over time, of generating those kinetic processes that lead them to precipitate and with this to sediment in the condenser. Moreover, an improved and more complete expulsion of the solutes with allow the efficiency of the condenser to be increased.

U.S. Patent Application Publication No. 20081078672 shows a through-flow condenser equipped with porous electrodes with semi-permeable membranes positioned adjacent to the electrodes, which are advantageously provided with a plurality of holes that make it possible, during the regeneration step of the condenser, to better and more completely evacuate the solute ions trapped previously in the small volume defined at the electrodes.

During the regeneration step, the ions trapped in such a volume, i.e. in the semi-permeable membrane as well as at the pores of the material that makes up the electrode, are made easier to remove from the aforementioned holes to then be transported out from the condenser by the discharge flow.

There are also through-flow condensers in which, during a foreseen sanitization step, the liquid to be treated has an acid product added to it, for example citric acid, capable of attacking the sediment and encrustations already formed in the passage channels of the condenser progressively dissolving them in the discharge flow.

Such acid products are generally introduced into the liquid in the form of tablets when it has been noted that there has been a decrease in the flow that passes through the condenser showing that the passage channels have at least partially become blocked due to the undesired precipitation of salts. Such tablets, upon contact with the flow of liquid to be treated, go by lixiviation into solution and reaching the encrustations, dissolve them into the discharge flow. This last operating method of the through condenser has proven not to be without drawbacks. Firstly, the sanitization step is only foreseen when the precipitations of salts have already occurred and thus only after the condenser has shown malfunctions and reduced efficiency. Moreover, in order to dissolve the encrustations, for example of limestone already formed by the precipitation of calcium bicarbonate, it is necessary to use a substantial amount of acid product and for a substantial time of use. Finally, it is often the case that the channels completely blocked by encrustations are no longer able to receive the fluid and therefore can no longer be cleaned of the encrustations through such a sanitization step.

From patent WO 2008/094367 there is a known through-flow condenser provided with a plurality of electrodes made from porous material (in particular carbon-based—see paragraph 38) spaced apart by spacing layers, which during a regeneration step are discharged or fed with opposite voltage to ensure that the charged particles that have saturated the electrodes can flow in the flow of fluid that passes through the cell (see paragraph 33).

The device foresees not to use the same source of liquid to be treated for the regeneration step, but rather a different source, in particular the liquid already used for the washing of the cell in previous steps, which has accumulated in a tank and been made to recirculate many times in the cells during the regeneration steps. The liquid contained in the aforementioned tank over time increases its concentration until it reaches a concentration in which it precipitates and can be removed from the tank (see paragraphs 60, 67).

At the end of the regeneration step and when the treatment of the liquid to be purified starts back up again, in order to avoid the first part of the latter mixing with the liquid with high salt concentration left in the cells during the regeneration step, it is foreseen for it to be possible to empty the cells with pressurised air or to separate the first part of liquid of the new treatment cycle.

The condenser described in this patent foresees washing the cells by making a flow of washing water flow through them and it does not examine the problem of the diffusion of the ions trapped in the gaps of the carbon sponge that constitute the electrodes with the result that when the treatment cycle starts up again the electrodes (especially if covered by a membrane of semi-permeable material) are not completely regenerated and the cell has a limited efficiency.

Such a device also involves the consumption of a substantial amount of water to regenerate the cells.

Patent WO 2006/079417 describes a through-flow condenser provided with a plurality of n plates with conductive surface (for example made from carbon or conductive polymers) connected to a direct current potential source and separated from one another by n−1 non-conductive spacers.

Since the plates have a limited capacity they need to be regenerated to remove the ions that have accumulated on the plates. This is obtained by making a flow of clean water flow while the plates are in short circuit or charged with opposite polarity. The regeneration time period depends on the concentration of ions in the supply water and on the hardness of the water. The water of the regeneration cycle, since it has highly charged ions, is discarded.

Acidic water can be used to decrease the amount of water to be used. In order to prevent the ion-rich water from precipitating during the regeneration step water with low PH is therefore preferably used through the addition of acid preferably produced on location with a PH-modifier, or rather with a device that divides the water into an acidic flow and an alkaline flow through electrolysis cells (see pages 11, 12).

The condenser described in this patent foresees to regenerate the cells by making a flow of acidic washing water flow through the cells and it does not examine the problem of the diffusion of the ions trapped in the gaps of the carbon sponge that constitute the electrodes with the result that when the treatment cycle starts up again the electrodes (especially if covered by a membrane of semi-permeable material) are not completely regenerated and the cell has a limited efficiency.

Such a device also involves the consumption of a substantial amount of water to regenerate the cells.

Flow condensers of the type known up to now do not foresee an operating process that makes it possible to inhibit the generation or at least to greatly reduce the precipitation of salts in the flow condensers used for example for water desalination.

In particular, the operating methods adopted up to now for flow condensers to not sufficiently take into account the kinetics that leads the salts dissolved in the fluid to be treated to precipitate in the flow condenser.

PRESENTATION OF THE INVENTION

In this situation the problem forming the basis of the present invention is therefore that of eliminating the problems of the prior art quoted above, providing a method for purifying a fluid through a through-flow condenser, which makes it possible to inhibit, or at least hinder, the formation of precipitates inside the condenser itself.

Another purpose of the present invention is to provide a method for purifying a fluid through a through-flow condenser, which makes it possible to dissolve the encrustations possibly formed inside it.

Another purpose of the present invention is to provide a method for purifying a fluid through a through-flow condenser, which has low maintenance costs since it requires few interventions.

Another purpose of the present invention is to provide a method for purifying a fluid through a through-flow condenser, which can be used to sanitize the water for hydraulic systems for civil and industrial use, without altering the smell or taste of the water itself, and which it totally safe for the health of the users that drink it.

Another purpose of the present invention is to provide an apparatus for purifying a fluid from contaminants through a through-flow condenser, in particular able to operate in accordance with the method according to the invention, which is simple and cost-effective to make and operatively totally reliable.

Another purpose of the present invention is to provide an apparatus for purifying a fluid from contaminants through a through-flow condenser, which can operate totally automatically.

BRIEF DESCRIPTION OF THE DRAWINGS

The technical characteristics of the finding, according to the aforementioned purposes, can be clearly seen from the content of the claims given below and their advantages will become even clearer in the following detailed description, made with reference to the attached drawing, which represents an embodiment thereof given purely as an example and not for limiting purposes, in which:

DETAILED DESCRIPTION OF A PREFERRED EMBODIMENT

Figure 1:
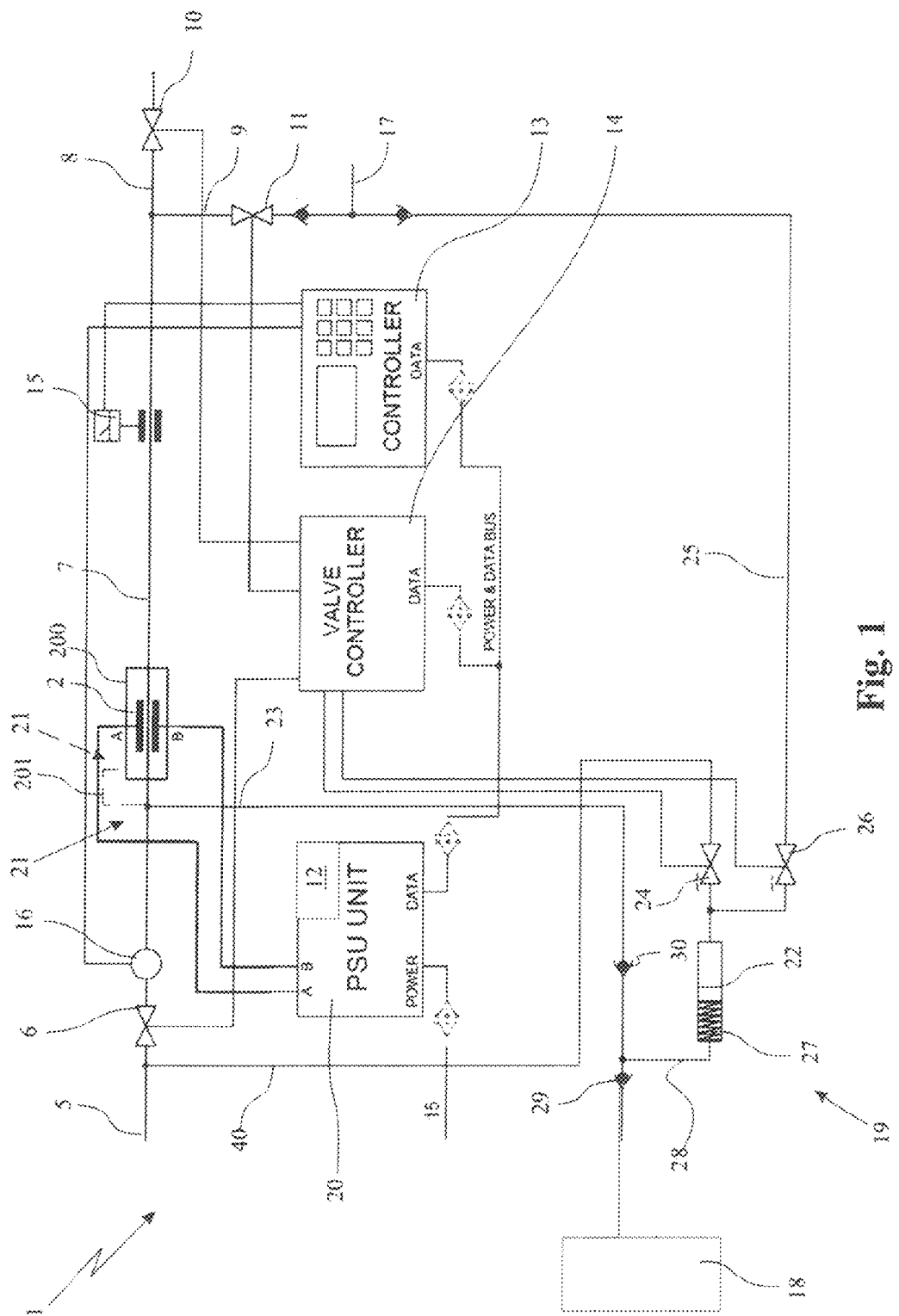
FIG. 1 shows an operation diagram of an apparatus for purifying a fluid from contaminants through a through-flow condenser according to the invention.

With reference to the attached drawings reference numeral 1 wholly indicates an example of an apparatus for purifying a fluid from contaminants.

The apparatus 1, according to the invention, lends itself to being used for the purification of fluids from ionized particles present inside it able to be affected by the presence of an electric field, like for example ions in solution.

Hereafter the term ionized particles will be generically used to indicate any contaminant dissolved in the fluid to be treated able to be attracted by an electrostatic field, like in particular the ions dissolved in a solution.

Therefore, the apparatus lends itself to operating for the deionization of fluids of industrial processes and for the deionisation of water, in particular for the desalination of sea water, since it is in particular able to remove salts in solution (such as chlorides and sulphates), nitrates, nitrites, ammonia, and other polarized contaminants of organic substances or of micro-pollutants in general from inside it.

In the embodiment illustrated in the attached diagram the apparatus for purifying a fluid comprises a through-flow condenser 2 formed, in a per sé known way, by a plurality of electrodes 3, housed in a container 200, electrically connected, through suitable connectors, to a DC power supply. The latter charges adjacent electrodes 3 with different polarity so as to define a plurality of pairs of opposite electrodes that form the armatures of as many condensers in series between which electric fields are established.

The electrodes are charged for example at a voltage of 1.6 Volts and are obtained with opposite and stacked layers of conductive material, separated from one another by spacing layers 4 in which the flow of fluid to be treated containing the ionized particles that it is wished to at least partially remove flows.

The conductive layers which form the electrodes 3 are made from a conductive material with a porous structure, i.e. with a formation of surface pores that offer a substantial exchange surface with the liquid.

The material that makes up the conductive layers can be any material known to be used in the electrochemical processes of flow condensers and it will conventionally comprise active carbon sponge, i.e. it can consist of any of the materials described for example in U.S. Pat. No. 6,413,409 attached hereto for reference from line 64 of column 3 to line 41 of column 4, or of conductive flexible sheets of PTFE and carbon particles as described in U.S. Pat. No. 7,175,783 attached hereto for reference, or from any material described in U.S. Pat. No. 6,709,560, attached hereto for reference, from line 26 of column 6 to line 23 of column 7.

The spacing layers 4 can in turn for example consist of non-conductive highly porous materials, capable of insulating the electrodes while allowing the flow of fluid to pass, like for example a porous synthetic material or other non-conductive spacing materials like fibreglass or nylon fabric.

The shape, size and distribution of the layers of conductive material that make up the electrodes 3, i.e. the shape, size and distribution of the layers of separating material arranged between the electrodes do not form the object of any specific claim and will not be described in detail since they are well known to the man skilled in the art and, purely as an example described in U.S. Pat. No. 6,413,409 or in U.S. Pat. No. 6,709,560, attached hereto for reference, in particular from line 11 to line 23 of column 7.

The apparatus 1 also comprises a hydraulic system, which feeds the through-flow condenser 2 with a flow of fluid to be treated through a supply conduit 5 intercepted by a first electrovalve 6.

The flow of fluid that passes through the condenser 2 is conveyed into a removal conduit 7, which is divided into a service branch 8, able to transport the flow of treated fluid from the condenser 2 having a low concentration of ionized particles, and into a removal branch 9, able to transport a discharge flow usually, as will be indicated more clearly hereafter, having a high concentration of ionized particles.

With reference to the embodiment illustrated as an example in FIG. 1, the service branch 8 is intercepted by a second electrovalve 10 whereas the removal branch 9 is intercepted by a third electrovalve 11.

The through-flow condenser 2 is fed by a DC power supply 20 equipped with a control board with integrated circuits 12, which, in the different operative steps of the operating cycle of the condenser 2, typically through semiconductor switches, controls the voltage applied to the electrodes through suitable connection collectors.

Such a cycle can for example foresee, in a per sé totally conventional way and well known to the man skilled in the art: a charging step, in which the power supply 20 charges the adjacent electrodes 3 with different polarity to take them to a constant operating voltage, for example equal to 1.6 V; and a service step, in which with the electrodes charged, the flow of fluid to be treated is forced to pass through the condenser 2, through the supply conduit 5 and the removal conduit 7. During such a service step there is the purification of the fluid from the polarised particles due to the fact that the ionized particles are attracted by the respective electrodes with opposite polarity to their own, causing a progressive accumulation of these ionized particles on the electrodes themselves.

Once the programmed saturation of the electrodes with polarised particles present in the fluid has been reached, it is foreseen for there to be a regeneration step, in which with the electrodes 3 deactivated, a flow of discharge fluid is forced to pass into the condenser 2 with consequent removal of the ionized particles that have accumulated on the electrodes 3.

During this step the electrovalve 10 of the service branch 8 is closed and the third electrovalve 11 of the removal branch 9 is opened. Usually, the flow that passes into the removal branch 9 should be considered as waste and, in the case in which it concerns an apparatus for deionising water, it will be sent to the normal discharge 17 foreseen for the hydraulic system.

By the term "deactivated" we mean all those conditions to which the electrodes 3 are subjected before starting up the charging step and that generally foresee a charging step with short circuiting of the electrodes 3, a positive discharging step in which the electrodes 3 are subjected to a voltage with inverted polarity, aimed at taking the charged particles away from the electrodes 3, in which they had accumulated, and a step of absence of voltage before restarting the charging step.

Usually, before restarting the service step there is also a pre-production step, in which the flow of fluid to be treated continues to be conveyed to the discharge waiting for the condenser 2 to reach the charge to the foreseen voltage and thus for the electrodes 3 to be completely efficient for their purification action of the liquid from the ionized particles.

The aforementioned charging step initially absorbs a very high inrush current from the power supply 20 that tends to fall as the condenser 2 discharges until it is quite low during the service step and substantially equivalent to the charge exchanged by the electrodes 3 with the fluid.

All of the aforementioned charging and discharging steps are managed by the board 12 of the power supply 20 in a per sé known way.

Therefore, by the term "deactivated" referring to the electrodes 3 we mean all the possible voltage conditions present at the electrodes 3 in the regeneration step such as: the condition with short circuited electrodes, the condition with electrodes charged with inverted polarity, the condition with electrodes not connected to the power supply.

A master cpu logic control unit 13 actuates the different operative steps of the apparatus 1. Advantageously, the cpu 13 is connected to a conductivity sensor 15 arranged to intercept the removal conduit 7, to verify the conductivity of the fluid that has been treated by the flow condenser 2, and to a flow measurer 16, arranged to intercept the supply conduit 5, to verify the flow rate entering into the condenser 2.

Thanks to the flow rate and conductivity values taken up, the cpu 13 can vary its operation in a programmable manner by foreseeing for example more or less long service steps with respect to the regeneration steps.

According to the idea forming the basis of the present invention, the apparatus 1 also comprises a tank 18 of a solubilizing product and introduction means 19, hydraulically connected to the tank 18, able to introduce, with the flow of the supply conduit 5 interrupted by the first electrovalve 6 (forced by the control unit 13 in closure position), a dose of solubilizing product received from the tank 18, in a section 21 of the supply conduit 5 arranged upstream of the electrodes 3.

Once the aforementioned dose of solubilizing product has been inserted into the section 21 of the supply conduit 5, the logic control unit 13 controls the forward movement of a fluid transportation flow rate through the section 21 forcing in aperture position the first electrovalve 6; said flow rate is determined in its quantity through a timer and/or through the flow measurer 16, to transport the dose of solubilizing product in the condenser 2 and make it reach and stop at and in contact with the electrodes 3.

The laminar forward motion of the flow of fluid in the supply conduit 5 determines a modest dilution of the dose of solubilizing product up to the entry of the condenser, allowing a saving in the amount of solubilizing product to be used and it thus makes it possible, with a tank of small dimensions, to have automatic operation of the apparatus 1 even for very long periods of time.

Once the aforementioned fluid transportation flow rate has been transited, the unit 13 once again stops the flow of fluid of the supply conduit 5 controlling the closure of the valve 6.

At this point, the apparatus 1 stays switched off, i.e. in stand-by, for a waiting time period of at least 5 minutes and preferably of 10-30 minutes, in which the ionized particles at least partially diffuse in the dose of solubilizing product that has stopped in the condenser 2, from the interstitial pores present in the layers of conductive material of the electrodes 3.

Obviously, without departing from the protective scope defined by the present patent, the section 21 is upstream of the condenser 2 and it therefore may be identified either in the piping of the supply conduit 5 upstream of the container 200 for housing the electrodes 3 or in the volume of the container 200 placed before the electrodes 3 of the condenser 2. Said volume of the container 200 placed before the electrodes 3 has to be considered as an end part of the supply line 5. In this latter case it may be provided on the container 200 a dedicated hydraulic connection 201 for the insertion of the solubilizing product by means of the introduction means 19. Also in this case, once entered the above-mentioned dose of the solubilizing product in the section 21 of the container 200 (i.e. in the volume of the container 200 upstream of the electrodes 3), the logic control unit 13 controls the forward movement of a fluid transportation flow rate through the section 21, by entering the fluid in the supply conduit 5 (or otherwise introducing said fluid through the same dedicated hydraulic connection 201 suitable for the insertion of the solubilizing product, by means of a conduit, non illustrated, connecting the supply conduit 5 with the connection 201). As above considered, Said flow rate is determined in its quantity through a timer and/or through the flow measurer 16, and transports the dose of solubilizing product in correspondence of the electrodes 3, where said dose stops remaining in contact with the electrodes 3.

In accordance with the preferred embodiment of the present invention illustrated in the diagram of FIG. 1, the injection means 19 are obtained with a volumetric syringe 22, which takes in a concentrated solubilizing product from the tank 18 and sends it through a delivery conduit 23, intercepted by a first non-return valve 30, to the section 21 of the supply conduit 5.

Advantageously, the aforementioned volumetric syringe 22 has a product loading chamber divided with a plunger from a pressurised chamber, which is connected through a branching conduit 40 intercepted by a third valve 24 to the supply conduit 5 arranged upstream of the first valve 6 and connected, through an outlet duct 25, intercepted by a fourth valve 26, to the discharge 17 at ambient pressure.

Functionally, with the first valve 6 closed, the cpu 13 controls the opening of the third valve 24 that brings pressure to the chamber of the syringe 22 moving the plunger by overcoming the reaction force of the elastically yielding means (such as a simple spring 27), so as to emit the dose of solubilizing product out from the product loading chamber making it run through the delivery conduit 23 until it is inserted into the section 21 of the supply conduit 5.

At this point, the cpu 13 closes the third valve 24 and opens the fourth valve 26 allowing the plunger of the syringe 22 to stop under the action of the spring, causing a depression that draws another dose of product from the tank 18 through a foreseen connection conduit 28 intercepted by a second non-return valve 29.

By the term "solubilizing product" we mean any product, advantageously in particular available in a solution for easy insertion into the condenser 2, able to increase the solubility of the specific ionized particles with which it is intended to interact in the foreseen application, increasing its precipitation threshold. It will therefore consist, for example, of a solution containing a counterion capable of inhibiting, within certain limits, the precipitation of the ion contained in the fluid to be treated and thus for example it can consist of an acidic solution for the solubilisation of carbonates or of nitrates.

In accordance with a preferred embodiment of the present invention the electrodes 3 comprise a layer of semi-permeable material 31, which can be associated in various ways with the layer of conductive material. In greater detail, such a layer 31 can be separate from the layer of conductive material, or placed on top of its coating, or even infiltrated in its pores or it can consist of the same layer of conductive material as for example described in U.S. Pat. No. 6,709,560, attached hereto for reference, from line 27 of column 6 to line 10 of column 7. In accordance with the example illustrated in the attached FIGS. 2-4, the layer of semi-permeable material 31 is separated through a spacer 32 from the surface of the electrode 3. Such a further layer of semi-permeable material 31 can be obtained with a semi-permeable membrane or with one or more layers of charged material as for example described in U.S. Pat. No. 6,709,560, attached hereto for reference, from line 50 of column 4 to line 10 of column 7. As described in U.S. Pat. No. 7,175,783, the layer of semi-permeable material is suitable for selectively trapping the ions that migrate towards the electrodes 3 under the action of the field during the service step, making it possible to improve the performance of the condenser 2, i.e. to hold a greater amount of charged particles in the aforementioned service step. These particles are then, at least partially, released from the electrodes 3 during the subsequent regeneration step, in particular passing through foreseen holes 33 formed in the layer of semi-permeable material 31.

The present invention has surprisingly been able to show that, by programming the insertion of a dose of solubilizing product after preset periods of time at the electrodes 3, in the aforementioned ways, and consequently by waiting for a waiting time of more than 5 minutes, it is possible to automatically prevent the formation of encrustations and precipitations that, otherwise, can reduce or, worse, compromise the efficiency of the apparatus 1.

By the term "interstitial pores" we mean all of the pores, micropores or holes present in the electrodes 3 or in the layers that make up the electrodes 3 such as the layers of conductive material and of semi-permeable material 31. They have been indicated with reference to the embodiment shown in the attached FIGS. 2-4 with reference numeral 34 with reference to the pores of the layers of conductive material and of semi-permeable material 31, and with reference numeral 33 with reference to the holes, greater in size than the pores 34, formed on the layer of semi-permeable material 31.

The object of the present invention is also a method for purifying a fluid through a through-flow condenser, which in particular can use the apparatus 1 described above for which, for the sake of simplicity of presentation, the same reference numerals and nomenclature will be kept.

The aforementioned method foresees the cyclical repetition of: a charging step, in which the power supply 20 charges the adjacent electrodes 3 with a different polarity; a service step, in which the flow of fluid to be treated is forced to pass into the condenser 2 through the electrodes 3 with consequent migration of the ionized particles towards the electrodes 3 with opposite polarity with respect to their own and with progressive accumulation of the ionized particles on the electrodes 3 themselves; and a regeneration step, in which with the electrodes 3 deactivated, a flow of discharge fluid is forced to pass into the condenser 2 with consequent removal of the ionized particles that have accumulated on the electrodes.

According to the idea forming the basis of the present invention the method for the purification of the fluid also has a cleaning step suitable for counteracting the precipitation of the ionized particles, which foresees: a step of introducing a dose of solubilizing product in the condenser 2 at the electrodes 3; a stopping step, in which the flow of fluid is stopped for a time period of at least 5 minutes with consequent at least partial diffusion of the ionized particles from the interstitial pores of the electrodes in the dose of solubilizing product suitable for keeping the ionized particles themselves in solution; and a discharge step, in which the dose of solubilizing product containing the ionized particles diffused inside of it is expelled through a flow of discharge fluid.

Advantageously, the aforementioned introducing step, is obtained by interrupting the supply of the flow of fluid towards the condenser 2; inserting the dose of solubilizing product into the section 21 of the supply conduit 5 upstream of the electrodes 3 of the condenser 2 (ie in the pipe of the supply conduit 5 or in the volume of the container 200 upstream of the electrodes 3); restarting the flow of fluid to make a transportation flow rate move through the section 21 at a rate suitable for bringing the dose of solubilizing product introduced into the section 21 up to the electrodes 3.

After said time period has passed, the discharge step is actuated by restarting the flow of fluid to expel the dose of solubilizing product containing the ionized particles diffused inside, through a flow of discharge fluid.

In accordance with a possible embodiment of the present invention, the aforementioned step of introducing a dose of solubilizing product at the electrodes 3 can be reached by interrupting the supply of the flow of fluid towards the condenser 2; by inserting the dose of solubilizing product directly in the container 200 in correspondence of his volume placed upstream the electrodes 3 of the condenser 2, and hence by restarting the flow of fluid to make a transportation flow rate move through the section 21 at a rate suitable for bringing the dose of solubilizing product introduced into the section 21 up to the electrodes 3. At this aim the container 200 for housing the electrodes 3 of the condenser 2 is provided with a dedicated hydraulic connection 201 for the insertion of the solubilizing product by means of the introduction means 19.

In accordance with a preferred embodiment of the present invention, the aforementioned dose of solubilizing product is inserted in a measured manner into the supply conduit 5 through volumetric injection means 19, in particular a syringe 22.

The cleaning step is started up repeatedly by the programmable logic control unit 13, in particular cyclically, once a predetermined number of service step and regeneration step cycles have been reached.

Such a predetermined number of cycles can be determined automatically by the programmable logic control unit 13 as a function of the flow rate data and/or of the conductivity data received respectively from the flow measurer 16, arranged to intercept the supply conduit 5, and from the conductivity sensor 15, arranged to intercept the flow of fluid that passes through the removal conduit 7.

The cleaning step can also be started up automatically by the programmable logic control unit 13 after each time the condenser 2 has stopped, for example due to the filling up of the container or tank that the removal conduit 7 feeds during the service step.

In the case in which the electrodes 3 are equipped with a layer of semi-permeable material 31, during the stopping step, the ionized particles at least partially diffuse into the dose of solubilizing product both from the interstitial pores 3 of the layers of conductive material 3 and also from the interstitial pores 34 of the layers of semi-permeable material 31 also including the foreseen holes 33 advantageously formed on these last layers.

Figure 3:
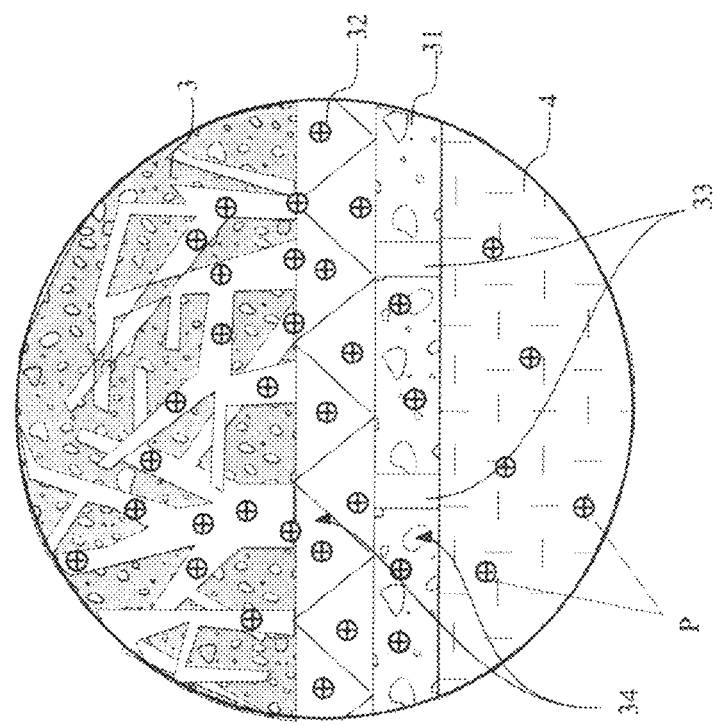
FIGS. 3, 4 and 5 show an enlarged detail of the section of FIG. 2 at three different operative steps of the method for purifying a fluid through a through-flow condenser, according to the invention.
Figure 2:
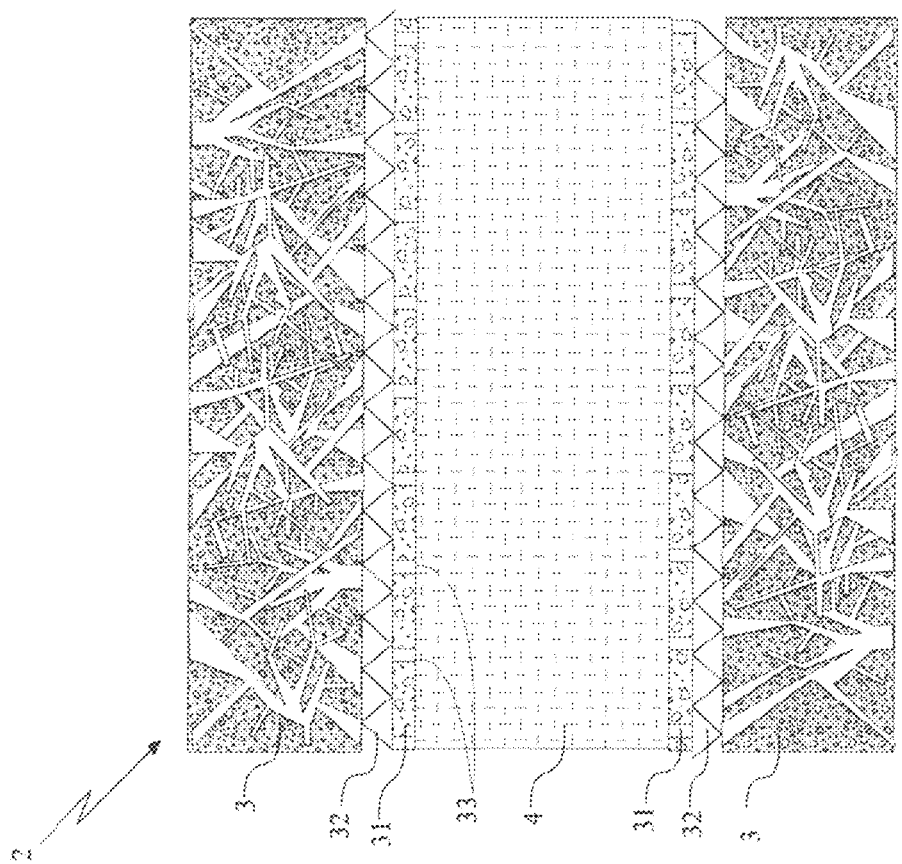
FIG. 2 schematically shows a detail of the apparatus for purifying a fluid object of the present invention relative to a portion in section of the layers that make up the through-flow condenser.
Figure 4:
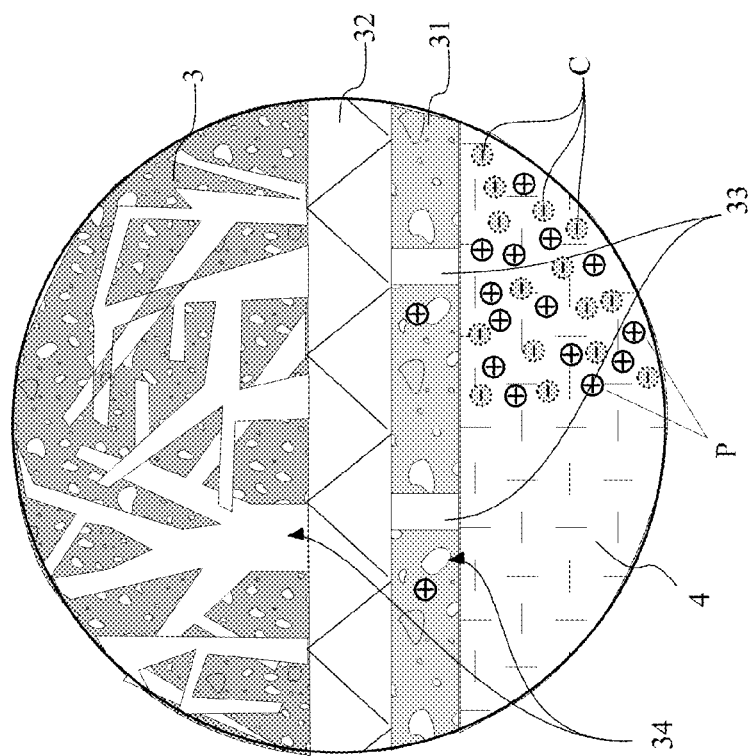
Figure 5:
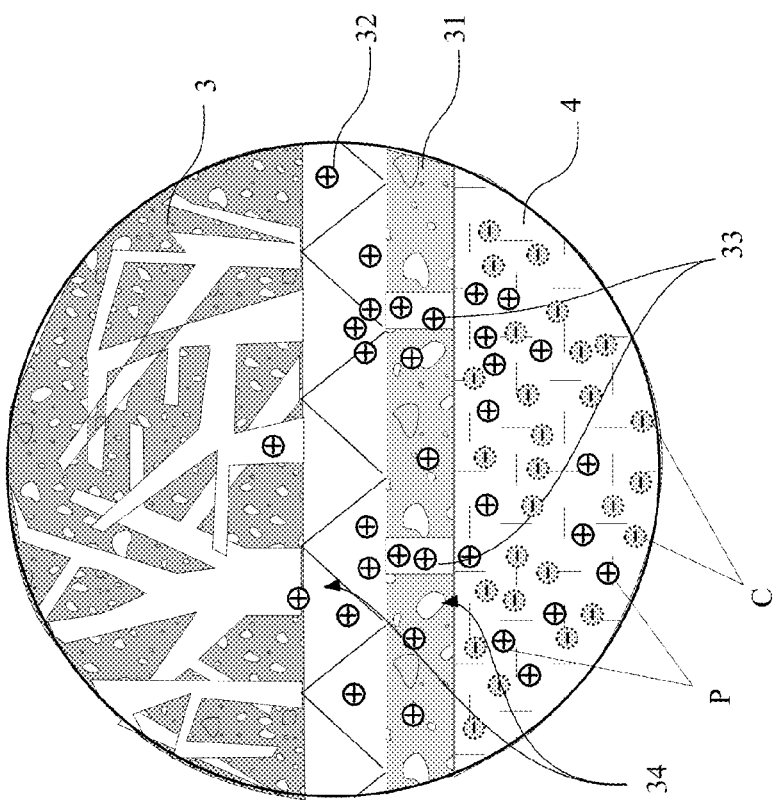

FIGS. 3, 4 and 5 illustrate, even if schematically, the service, insertion, stopping and discharge steps of the method object of the invention, with reference to an embodiment of the condenser 2, of which just a pair of electrodes 3 of the plurality that makes up the condenser 2 itself has been reproduced in FIG. 2.

In FIG. 3 the ionized particles, indicated with P are attracted by the electrode of opposite polarity, selectively passing the layer of semi-permeable material 31 and being arranged in the gap defined between such a layer and the surface of the electrode 3, as well as in the interstitial pores 33, 34 of the layers of conductive material and of semi-permeable material 31.

Once the dose of solubilizing product, containing for example a counterion indicated with C in the attached FIGS. 2-5, after the introduction step comes close to the electrode 3 staying in contact with it for the entire stopping step, the ionized particles P diffuse from the interstitial pores 33, 34 of the layers of conductive material and of semi-permeable material 31, including the holes 33 formed on this last layer 31, distributing in the aforementioned dose of solubilizing product that inhibits its precipitation, as indicated in FIG. 4.

FIG. 5 indicates the starting up of the discharge step, in which the dose of solubilizing product containing the ionized particles diffused inside it is expelled through a flow of discharge fluid.

The device thus conceived therefore achieves the preset purposes.

Of course, it can, in its practical embodiment, also take up different shapes and configurations from the one illustrated above, without for this reason departing from the present scope of protection.

Moreover, all of the details can be replaced by technically equivalent elements and the shapes, sizes and materials used can be whatever according to needs.

The invention claimed is:

1. A method for purifying a fluid through a through-flow condenser having:
   at least two stacked electrodes (3) facing one another, equipped with interstitial pores (33, 34) and each comprising a layer of conductive material;
   at least one spacing layer (4), each spacing layer arranged between adjacent electrodes of said at least two stacked electrodes (3) the at least one spacing layer (4) being able to receive a flow of fluid to be treated containing ionized particles;
   said condenser (2) being electrically connected to a direct current power supply (20) able to charge said at least two stacked electrodes (3) with respectively different polarities to create an electric field between them;
   said method cyclically comprising:
   at least one charging step, in which said power supply (20) charges said stacked electrodes (3) with said different polarities;
   at least one service step, in which a flow of said fluid to be treated is forced to pass, through a supply conduit (5) and a removal conduit (7), into said condenser through said stacked electrodes (3) with consequent migration of said ionized particles towards the electrodes (3) with polarity opposite to the polarity of the ionized particles and with progressive accumulation of said ionized particles on said stacked electrodes (3);
   at least one regeneration step, in which, with said stacked electrodes (3) deactivated, a flow of a discharge fluid is forced to pass into said condenser with consequent removal of said ionized particles that have accumulated on said stacked electrodes (3);
   at least one cleaning step suitable for solubilizing said ionized particles, that comprises:
   a step of introducing a dose of a solubilizing product into said condenser at said stacked electrodes (3);
   a stopping step, in which said flow of fluid is stopped for a period of at least 5 minutes with consequent at least partial diffusion of said ionized particles from the interstitial pores (33, 34) of said stacked electrodes (3) into said dose of solubilizing product able to keep said ionized particles in solution; and
   at least one discharge step in which said dose of solubilizing product containing said diffused ionized particles inside it is expelled through a flow of the discharge fluid,
   wherein said step of introducing comprises:
   interrupting the supply of said flow of fluid towards said condenser (2);
   introducing said dose of solubilizing product into a section (21) of said supply conduit (5) upstream of said electrodes (3); and
   restarting said flow of fluid to make a transportation discharge move through said section (21) at a volume suitable for bringing said dose of solubilizing product introduced into said section (21) up to said electrodes (3).

2. A method for purifying a fluid through a through-flow condenser having:
   at least two stacked electrodes (3) facing one another, equipped with interstitial pores (33, 34) and each comprising a layer of conductive material;
   at least one spacing layer (4), each spacing layer being arranged between adjacent electrodes of said at least two stacked electrodes (3) the at least one spacing layer (4) being able to receive a flow of fluid to be treated containing ionized particles;

said condenser (2) being electrically connected to a direct current power supply (20) able to charge said at least two stacked electrodes (3) with respectively different polarities to create an electric field between them;

said method cyclically comprising:

at least one charging step, in which said power supply (20) charges said stacked electrodes (3) with said different polarities;

at least one service step, in which a flow of said fluid to be treated is forced to pass, through a supply conduit (5) and a removal conduit (7), into said condenser through said stacked electrodes (3) with consequent migration of said ionized particles towards the electrodes (3) with polarity opposite to the polarity of the ionized particles and with progressive accumulation of said ionized particles on said stacked electrodes (3);

at least one regeneration step, in which, with said stacked electrodes (3) deactivated, a flow of a discharge fluid is forced to pass into said condenser with consequent removal of said ionized particles that have accumulated on said stacked electrodes (3);

at least one cleaning step suitable for solubilizing said ionized particles, that comprises:

a step of introducing a dose of a solubilizing product into said condenser at said stacked electrodes (3);

a stopping step, in which said flow of fluid is stopped for a period of at least 5 minutes with consequent at least partial diffusion of said ionized particles from the interstitial pores (33, 34) of said stacked electrodes (3) into said dose of solubilizing product able to keep said ionized particles in solution; and at least one discharge step in which said dose of solubilizing product containing said diffused ionized particles inside it is expelled through a flow of the discharge fluid, wherein said introduction step is obtained by interrupting the supply of said flow of fluid towards said condenser (2);

introducing said dose of solubilizing product into a section (21) of said supply conduit (5) placed upstream of said electrodes (3) and in an amount corresponding to the volume of the container (200) housing the electrodes (3) of the condenser (2); and restarting said flow of fluid to create a transportation flow rate of said dose of solubilizing product to cause said dose of solubilizing product to move through said section (21) at a volume suitable for bringing said dose of solubilizing product introduced into said section (21) up to said electrodes (3).

3. The method for purifying a fluid according to claim 1, further comprising during said introduction step, inserting said dose of solubilizing product in a measured manner into said section (21) through volumetric injection means.

4. The method for purifying a fluid according to claim 1, wherein said cleaning step is started up cyclically by a programmable logic control unit (13) once a predetermined number of service step and regeneration step cycles have been reached.

5. The method for purifying a fluid according to claim 4, wherein said predetermined number of cycles is determined by said programmable logic control unit (13) as a function of the flow rate data received from at least one flow measurer (16), positioned to intercept the flow of fluid that passes through said condenser (2), and/or the conductivity data from at least one conductivity sensor (15), positioned to intercept the flow of fluid that has passed through said condenser (2).

6. The method for purifying a fluid according to claim 1, wherein said cleaning step is started up after a predetermined number of service steps and regeneration steps have been reached.

7. The method for purifying a fluid according to claim 1, wherein at least one of said stacked electrodes comprises at least one layer of semi-permeable material and wherein during said stopping step said ionized particles diffuse from said at least one layer of semi-permeable material of said at least one of said stacked electrodes, the semi-permeable material being suitable for selectively trapping the ions that migrate towards the same stacked electrode under the action of the field, and wherein said ionized particles diffuse at least partially into said dose of solubilizing product from the interstitial pores of said at least one layer of semi-permeable material and of said layer of conductive material of said at least one of said stacked electrodes (3).

8. The method for purifying a fluid according to claim 7, wherein said layer of semi-permeable material (31) is provided with a plurality of holes (33) forming the interstitial pores through which during said stopping step said ionized particles diffuse in said dose of solubilizing product.

9. The method of claim 1, wherein, during said stopping step, flow of fluid is switched off for the period of said stopping step.

* * * * *